United States Patent [19]

Ballweber et al.

[11] 4,042,772

[45] Aug. 16, 1977

[54] UREA AS AN ADDITIVE TO IMPROVE THE VISCOSITY AND ACTIVITY OF ACRYLAMIDE—ACRYLAMIDE ACRYLIC ACID POLYMERS PREPARED FROM POOR QUALITY ACRYLAMIDE

[75] Inventors: Edward G. Ballweber, Glenwood; Wood E. Hunter, Lombard, both of Ill.

[73] Assignee: Nalco Chemical Company, Oak Brook, Ill.

[21] Appl. No.: 739,770

[22] Filed: Nov. 8, 1976

[51] Int. Cl.² .......................... C08F 2/00; C08F 4/00; C08F 20/70; C08F 120/54

[52] U.S. Cl. .................................... 526/220; 526/303

[58] Field of Search ......................................... 526/220

[56] References Cited

U.S. PATENT DOCUMENTS

| | | | |
|---|---|---|---|
| 2,552,327 | 5/1951 | Kropa | 526/220 |
| 3,284,393 | 11/1966 | Vanderhoff | 526/911 |
| 3,558,530 | 1/1971 | Schroder et al. | 526/220 |
| 3,708,444 | 1/1973 | Ganzler et al. | 526/220 |
| 3,864,323 | 2/1975 | Stoy | 526/220 |

*Primary Examiner*—Herbert J. Lilling
*Attorney, Agent, or Firm*—John G. Premo; Robert A. Miller; Barry W. Sufrin

[57] ABSTRACT

Poor quality acrylamide can be used to produce good quality water-soluble polymers by conducting the polymerization in the presence of urea.

3 Claims, No Drawings

UREA AS AN ADDITIVE TO IMPROVE THE VISCOSITY AND ACTIVITY OF ACRYLAMIDE-ACRYLAMIDE ACRYLIC ACID POLYMERS PREPARED FROM POOR QUALITY ACRYLAMIDE

INTRODUCTION

Until recent times, it was customary to prepare acrylamide by reacting acrylonitrile with sulfuric acid in an aqueous environment to produce acrylamide sulfate. The acrylamide sulfate would then be neutralized with sodium or ammonium hydroxide and then cooled. During the cooling process, quite pure acrylamide would be precipitated in the form of snowy white crystals.

Quite recently the sulfuric acid route for producing acrylamide from acrylonitrile has been supplanted by the reaction of acrylonitrile-water at elevated temperatures in the presence of certain metallic-containing catalysts, particularly, copper-containing catalysts. For example, see U.S. Pat. No. 3,631,104. These new catalytic processes are now used almost exclusively to produce acrylamide which is conveniently polymerized using a water-in-oil emulsion polymerization technique of the types described in U.S. Pat. Nos. 3,284,393 and 3,624,019, the disclosures of which are incorporated herein by reference.

In polymerizing acrylamide either alone or with other water-soluble vinyl monomers to produce water-soluble polymers, it was observed from time to time that certain batches of catalytically-produced acrylamide monomer failed to yield polymers having high intrinsic viscosities and good performance activity in relation to treating aqueous suspensions for the purpose of flocculating and settling such suspensions. This phenomenon is not fully understood although it is believed to be caused by impurities present in the starting acrylonitrile from which the acrylamide is produced. It has now been determined that when such poor batches of acrylamide are crystallized, an ability to produce satisfactory polymers is greatly improved. Crystallization, however, is expensive and adds substantially to the cost of the acrylamide. The phenomenon of poor quality acrylamide resulting from catalytically converted acrylonitrile is referred to hereafter as "contaminated" acrylamide. Its occurrence is spasmodic, unexplainable, and presents a vexatious problem when such acrylamide monomers are attempted to be converted into high quality polymers.

If it were possible to treat contaminated acrylamide by simple chemical means other than an expensive crystallization process whereby it could be rendered susceptible to forming good quality polymers, a valuable advancement in the art of preparing acrylamide polymers would be afforded.

THE INVENTION

In accordance with the invention, it has been found that contaminated acrylamide may be processed into high quality water-soluble acrylamide polymers by adding to such contaminated acrylamide at least 20% by weight and, preferably, 25 – 75% by weight of urea. For some unexplained reason, the urea which is present when the acrylamide is polymerized tends to allow the acrylamide to polymerize into good quality polymers.

This technique of adding urea to contaminated acrylamide to allow better polymers to be produced therefrom applies only to the utilization of acrylamide in producing homopolymers of acrylamide and acrylamide acrylic acid copolymers which contain at least 50% by weight of acrylamide.

The invention is particularly useful in treating contaminated acrylamide which is used to prepare polymers by the water-in-oil emulsion technique set forth in U.S. Pat. Nos. 3,284,393 and 3,624,019 previously discussed. It may also be used when acrylamide is polymerized in the form of an aqueous solution.

To illustrate the several advantages of the invention, Tables I and II are set forth below.

TABLE I

| | Effect of Urea on Acrylic Acid-Acrylamide Polymer | | | | | |
|---|---|---|---|---|---|---|
| Run | % Urea | $\eta/i$ | $\eta/f$ | Act.$_i$ | Act.$_f$ | 10 day-40° C Aged Act. |
| Run 27 | 75 | 26.7 | 24.6 | .40 | .55 | 1.05 |
| | 25 | 24.4 | 25.7 | .30 | .50 | 0.90 |
| | 10 | 19.8 | 18.6 | .70 | .90 | — |
| | 0 | 23.0 | 15.4 | .95 | 2.5 | — |
| Run 28 | 75 | 25.3 | 27.7 | 0.5 | .44 | |
| | 25 | 28.7 | 27.3 | 0.5 | .55+ | |
| | 15 | 24.2 | 18.2 | 0.5 | .97 | |
| | 0 | 16.0 | 20.2 | 1.3 | 2.0 | |
| Run 28B | 75 | 19.3 | 23.8 | .90 | .70 | .6+ |
| | 25 | | | .60 | .90 | 1.0 |
| | 0 | 10.3/15.4 | 9.7/13.5 | 1.1/.9 | 1.6/1.6 | — |
| | 25 | 20.6 | 21.4 | — | | |
| | 0 | 17.4 | 20.1 | 1.1 | 1.5 | |
| Run 23 | 25 | 25.4 | 27.0 | 0.4* | 0.5* | 0.95 |
| | 0 | 29.3 | 21.5 | 1.0* | 1.0* | 1.20 |
| Run 29 | 25 | — | 26.2 | 0.50 | 0.35 | 1.6 |
| | 10 | — | 24.2 | 0.40 | 0.30 | 1.5 |
| | 0 | — | 26.6 | | 0.40 | |
| Run 30 | 5 | — | 25.7 | — | 0.30 | |
| | 2.5 | — | 19.7 | — | 0.35 | |
| | 0 | — | 26.9 | — | 0.50 | |
| Crystallized | 25 | 27.3 | 26.0 | — | 0.3 | 0.35 |
| | 0 | — | 23.8 | — | 0.35 | 0.30 |
| Run 30 | 75 | | | | 0.30 | 0.50 |
| | 0 | | | | 0.35 | 0.95 |

*Run after 30 days at R.T.

TABLE II

| | Effect of Urea on Polyacrylamide | | | |
|---|---|---|---|---|
| Acrylamide Monomer | Urea | $/\eta/$ | Act. | Comments |
| Run 27 | 0 | 7.7 | 1.3 | |
| Run 27 | 25% | 10.2 | 1.2 | |
| Run 28B | 0 | 7.9 | 1.06 | pH 5.5 |
| Run 28B | 25% | 12.3 | 1.01 | pH 5.5 |
| Run 29 | 0 | 14.4 | | |
| Run 29 | 25% | 17.9 | | |

TABLE II-continued
Effect of Urea on Polyacrylamide

| Acrylamide Monomer | Urea | /η/ | Act. | Comments |
|---|---|---|---|---|
| Run 32 | 0 | 14.6 | | |
| Run 32 | 25% | 18.5 | | |

The polymers prepared in Tables I and II were water-in-oil emulsion polymers prepared by the technique set forth in U.S. Pat. No. 3,284,393. The starting charges had the following compositions:

| Charge for Polymer in Table I: Ingredients | % By Weight |
|---|---|
| Soft Water | 36.0494 |
| Acrylamide | 19.0761 |
| Acrylic acid | 8.1111 |
| Caustic soda (50%) | 8.9928 |
| Barium sulfate | .0050 |
| Isopar M[1];1-Mineral Oil | 25.7348 |
| Sorbitan Monooleate | 1.3519 |
| Azobisisobutyronitrile | .0300 |
| Toluene | .6489 |

| Charge for Polymer in Table II: Ingredients | % By Weight |
|---|---|
| Soft Water | 42.481 |
| Acrylamide | 27.050 |
| Boric Anhydride | .299 |
| Ethylene Diamine Tetraacetic Acid | .006 |
| Isopar M[1] | 28.392 |
| Sorbitan Monooleate | 1.760 |
| Azobisisobutyronitrile | .010 |
| Vazo 52[2] | .002 |

[1] Described in U.S. 3,624,019.
[2] a,a'-azobis (a, g dimethyl valeronitrile)

All of the polymerizations upon completion were heated in a post-heat step to 75° C. for 1 hour. The purpose of this heat step was to polymerize all of the non-reacted acrylamide remaining in the reaction vessel.

In the above tables, the following symbols were used:
η/i — Initial Viscosity — After Polymerization
η/f — Final Viscosity — Polymer aged 10 days at 40° C.
Act.$_i$ — Activity of Polymer after Preparation
Act.$_f$ — Activity of Polymer after Post Heating Table I shows that with good quality acrylamide, such as crystalline acrylamide, urea has no effect on the initial polymer quality, nor does the resultant latex show performance deterioration on accelerated aging. With catalytic acrylamide, mixed results were obtained. Contaminated monomer was substantially improved as shown for the results with Run 27, 28, and 28B monomer. With good quality catalytic monomer, initial polymer quality was not affected. In some cases (Run 30, Run 23), the accelerated aging of the polymer was inhibited, while in another (Run 29), no benefit was observed.

Results of urea addition to other latex polymers have shown no beneficial effect. The addition of urea to polyacrylamide latex preparation does, however, give improved intrinsic viscosity results as shown in Table II.

Having thus described our invention, it is claimed as follows:

1. A method for making good quality acrylamide and acrylamide acrylic acid polymers which contain at least 50% by weight of acrylamide from contaminated acrylamide which comprises polymerizing acrylamide to form a water-soluble acrylamide polymer in the presence of at least 20% by weight based on acrylamide of urea.

2. The method of claim 1 where the polymerization is a water-in-oil polymerization and the amount of the urea varies between 25 - 75% by weight.

3. The method of claim 2 where the polymer is an acrylamide acrylic acid copolymer.

* * * * *